United States Patent

Thorsen et al.

[11] Patent Number: 5,900,151
[45] Date of Patent: May 4, 1999

[54] METHOD FOR SULPHATE REMOVAL MAGNESIUM CHLORIDE BRINE

[75] Inventors: Thor Thorsen; Per Oscar Wiig; Ole Wærnes, all of Trondheim; Birger Langseth, Porsgrunn, all of Norway; Carl Margcotte, Portneuf-Station, Canada

[73] Assignee: Norsk Hydro ASA, Oslo, Norway

[21] Appl. No.: 08/968,615

[22] Filed: Nov. 13, 1997

[30] Foreign Application Priority Data

Nov. 13, 1996 [NO] Norway ..................................... 964810

[51] Int. Cl.⁶ .................................................. B01D 61/00
[52] U.S. Cl. ........................... 210/652; 210/651; 210/653; 210/641; 210/636
[58] Field of Search ..................................... 210/641, 652, 210/651, 653, 654, 636, 805

[56] References Cited

U.S. PATENT DOCUMENTS

| | | | |
|---|---|---|---|
| 5,454,952 | 10/1995 | Brewer | 210/651 |
| 5,458,781 | 10/1995 | Lin | 210/651 |
| 5,587,083 | 12/1996 | Twardowski | 210/652 |
| 5,616,249 | 4/1997 | Hodgdon | 210/652 |

OTHER PUBLICATIONS

Raman et. al, "Consider Nanofiltration for Membrane Separation", Chemical Engineering Progress, Mar. 1994.

Rautenbach et. al., Separation Potential of Nanofiltration Membranes, Desalination, 77 (1990) 73–84.

*Primary Examiner*—Ana Fortuna
*Attorney, Agent, or Firm*—Wenderoth, Lind & Ponack, L.L.P.

[57] ABSTRACT

Method for sulphate removal from concentrated $MgCl_2$ solutions, where the solution is subjected to a high pressure nanofiltration process applying membranes having a dominantly negative surface charge.

11 Claims, 6 Drawing Sheets

METHOD FOR SULPHATE REMOVAL MAGNESIUM CHLORIDE BRINE

The invention concerns a method for sulphate removal from magnesium chloride brine.

The electrolyte for producing magnesium metal from magnesium chloride consists of a certain mixture of several metal salts. It is important to control the content of both the necessary components and the impurities to achieve an optimal electrolytic production of magnesium metal. The main feed to the electrolytic process is magnesium chloride, free of water and with a maximum content of other salts and impurities. The magnesium chloride is produced from a magnesium chloride brine which undergoes several purification steps. Presently these known purification steps do not reduce effectively the sulphate content, especially in raw materials having a higher sulphate content.

It is known that sulphate can be removed from such solutions by adding $BaCl_2$ and the sulphate can be separated as a barium sulphate precipitate. However, this method is not acceptable in an industrial process due to environmental aspects. Also $CaCl_2$ could be added, and calcium sulphate precipitated, but then another process step has to be introduced to remove excess calcium, since the calcium content should also be kept below a certain level, and $CaCl_2$ will not bring the sulphate content low enough. Addition of $CaCl_2$ followed by $BaCl_2$ would in principle reduce the sulphate content to an acceptable level, but not use of $CaCl_2$ alone.

It is also known to subject the $MgCl_2$ brines to a rapid heating to form kieserite nuclei and holding the resulting slurry at elevated temperatures of 100–140° C. for a period of time followed by separation of brine from the kieserite crystals. This method represents an energy consuming step of heating and maintaining of the brine at high temperatures.

The object of the invention is to reduce the sulphate content in concentrated magnesium chloride solutions (brine) in an environmentally acceptable way without addition of chemicals or use of high energy demanding processes.

This and other objects/features of the invention are met by provision of a new method, as it appears from the accompanying patent claims.

The invention is described below with reference to FIGS. 1–6, where

FIG. 1 illustrates schematically the experimental set-up for membrane separation of sulphate.

FIGS. 2A,B and 3A,B show flux versus pressure and sulphate rejection versus flux for different membrane types and operating conditions.

The problems encountered with removal of impurities from magnesium chloride brines are high concentration of $MgCl_2$ (250–550 g/l) combined with elevated temperatures of 20–90° C.

Consequently, the hitherto known (commercial) membrane filtration is not a realistic viable removal alternative for several reasons. The actual solution is very special with respect to the concentration of water, which is very low in order to reduce the evaporation costs downstream in the process of preparing water free electrolyte feed, so that normal hydration of ions is impossible.

Furthermore, the particular task in this case is to remove sulphate from a concentrated solution where other ions dominate the amount of dissolved solids.

Based on a study of nanofiltration membranes made for high rejection of multivalent anions, a new version of this type of membranes has been developed and tested on laboratory and pilot scale resolving problems connected to high brine concentration and temperatures by adaptation of membranes and optimal operating conditions of the nanofiltration process.

The effect of negatively charged membranes to repel anions will in general be reduced in very concentrated solutions. However, this effect in the actual solutions is in favour of sulphate retention. The best membrane for sulphate removal is different in solutions with different level of total dissolved ions. Different flux will create altered charge conditions on and close to the surface of the membrane that will influence retention values and thus the sulphate selectivity and the osmotic back-pressure.

Figure 1:
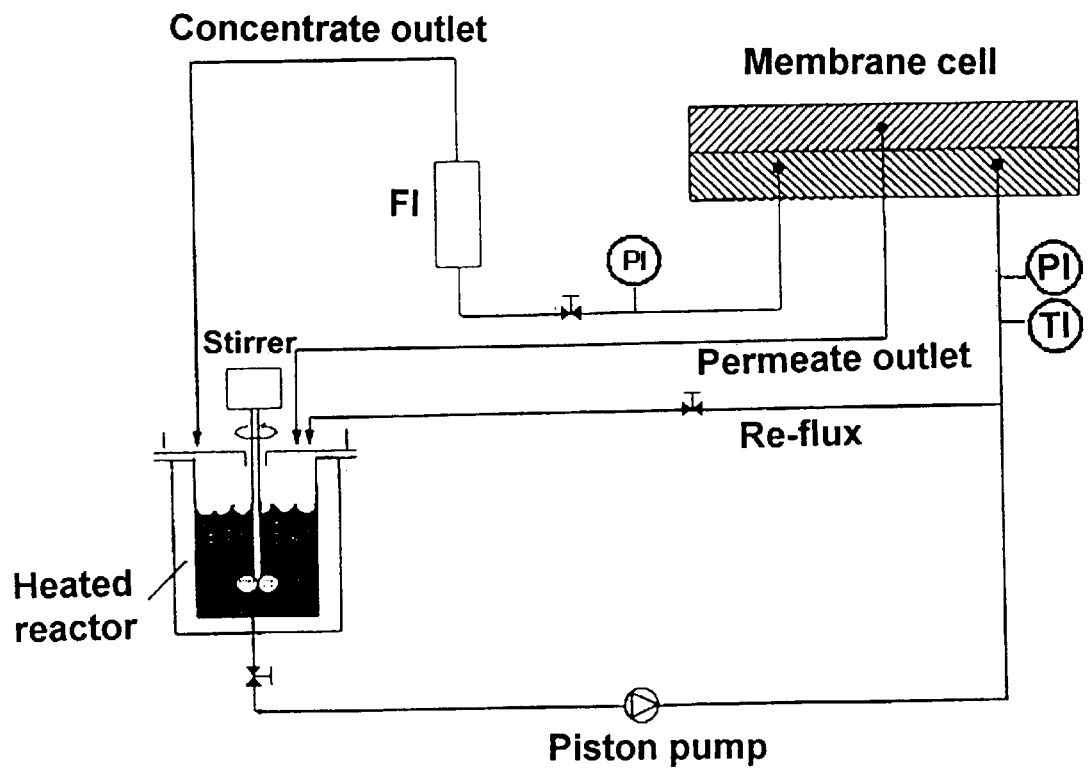

Different types of membranes have been tested in a laboratory scale crossflow membrane filtration unit, made for reverse osmosis, nanofiltration and ultra filtration tests, accepting any flat sheet membrane. The unit may operate at up to 69 bar and with a variety of flow volumes and flow pattern. The effective membrane area is 0.0155 $m^2$. The crossflow sectional area of the test cell is 95.2×10$^{-3}$ $m^2$ (width 95.2×10$^{-3}$ m, height 1.0×10$^{-3}$ m). The solution is circulated through the membrane unit by means of a piston pump as indicated in FIG. 1.

Several membrane types have been tested, but only 3 types worked out for sulphate removal from the actual $MgCl_2$ brine. The 3 types are known under the trade names (codes): B006, B007 and MQ17 delivered by Osmonics, USA. The membranes are porous polymer nanofilter membranes with average pore size of 0.5–2 nm. The polymers contain sulphonic acid groups.

EXAMPLE 1

Membrane type: B006

$MgCl_2$ concentration: 340 g/kg

Sulphate concentration (feed): 40–50 mg S/kg (measured as S)

Temperature: 70° C.

Flow: 108 kg/h (linear velocity 0.24 m/s)

Pressure: 10–60 bar

Figure 2A:
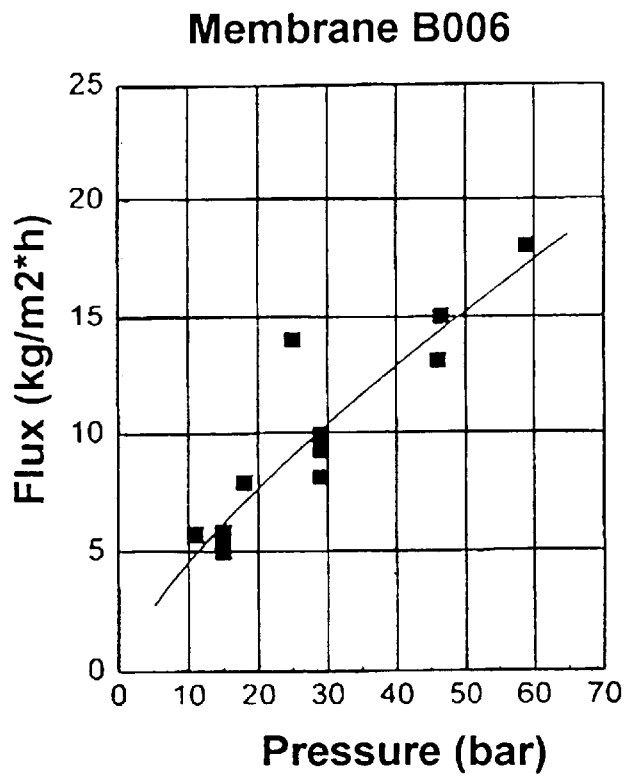
Figure 2B:
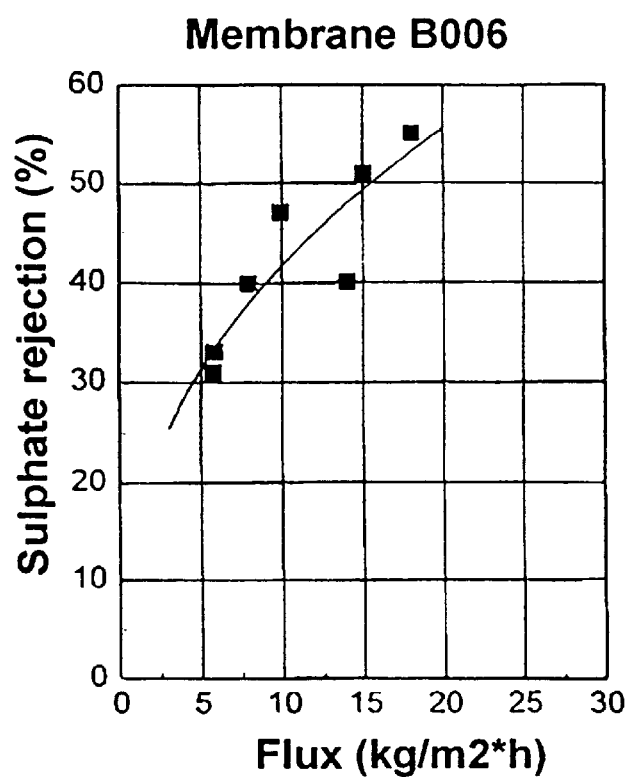

FIGS. 2A and B show the results as flux values versus applied pressure and sulphate rejection versus flux.

EXAMPLE 2

Membrane type: B007

$MgCl_2$ concentration: 340 g/kg

Sulphate concentration (feed): 40–50 mg S/kg (measured as S)

Temperature: 70° C.

Flow: 108 kg/h (linear velocity 0.24 m/s)

Pressure: 38–60 bar

Figure 3A:
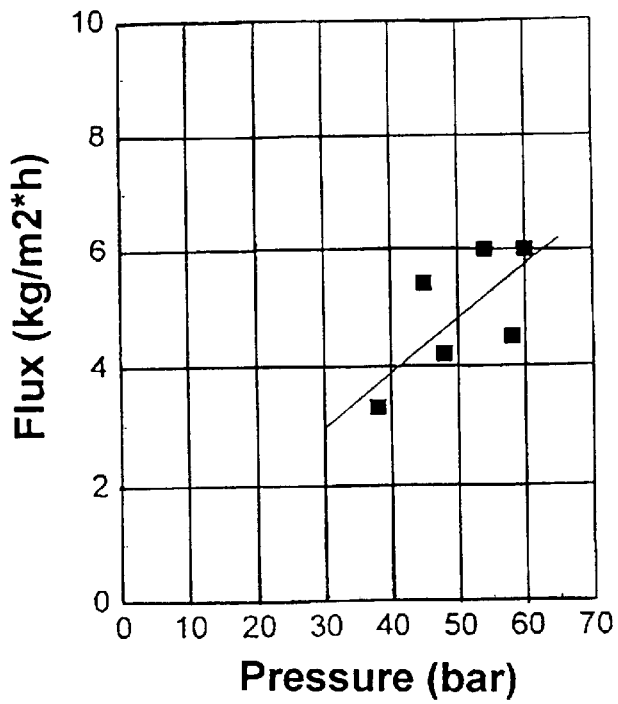
Figure 3B:
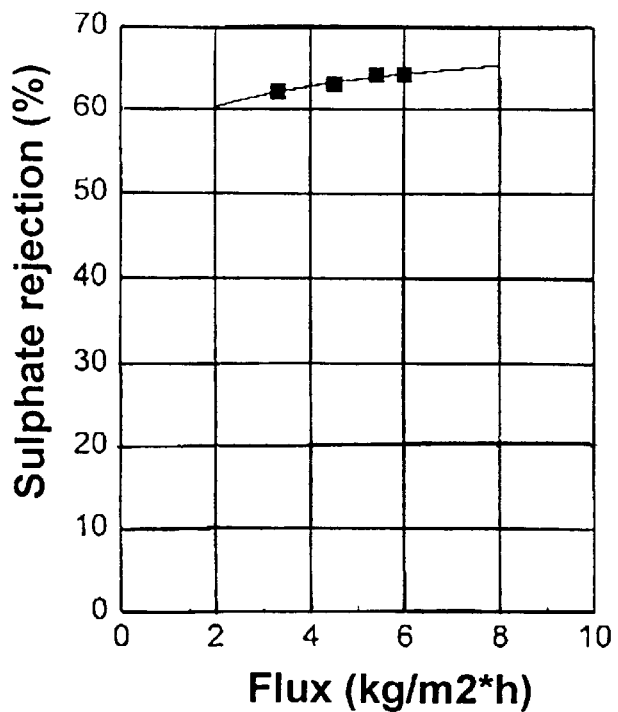

FIGS. 3A and B show the results as flux values versus applied pressure and sulphate rejection versus flux.

EXAMPLE 3

To maintain the flux over time it may be necessary to wash the membrane at certain time intervals. This is dependent on the actual type of membrane used, concentration and impurities. As shown in the following example it is possible to operate a membrane unit at a steady mean flux value, and constant sulphate rejection, by a suitable washing procedure.

Membrane type: B006

MgCl$_2$ concentration (real brine): 340 g/kg

Sulphate concentration (feed): 35 mg S/kg (measured as S)

Temperature: 70° C.

Flow: 53 kg/h (linear velocity 0.12 m/s)

Pressure: 50 bar

Figure 4:
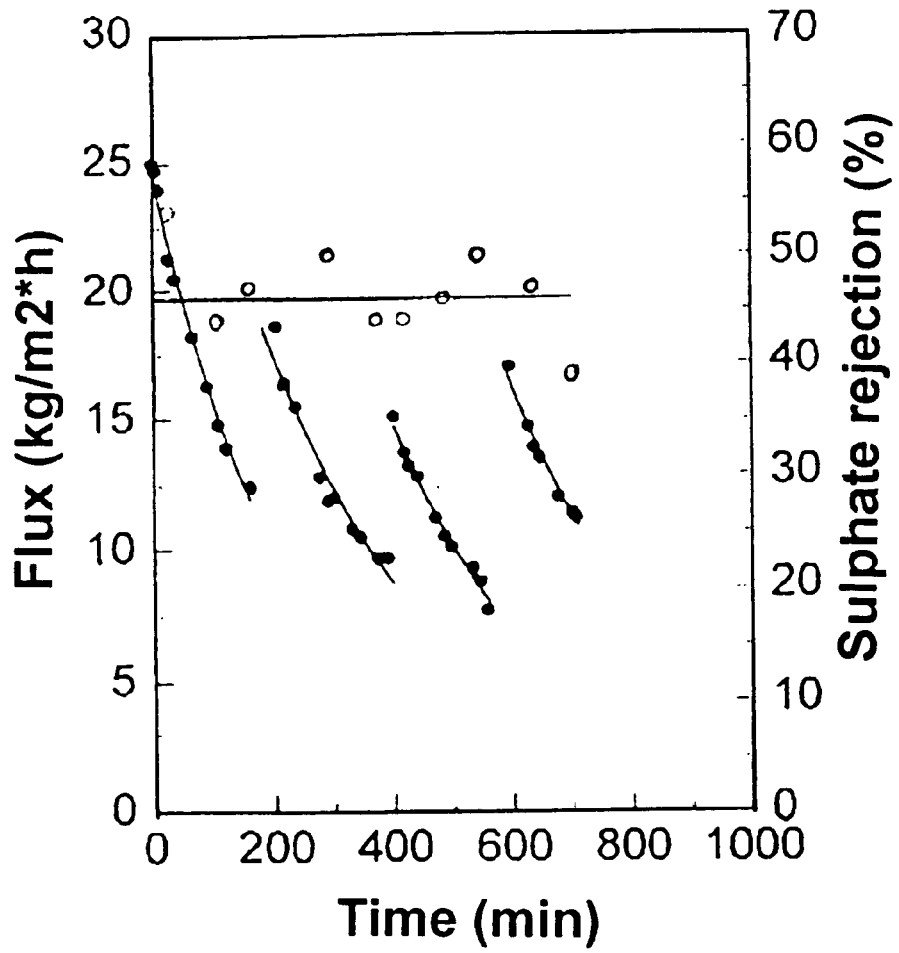
FIG. 4 shows flux and sulphate rejection versus time, displacement washing at certain time intervals.

FIG. 4 shows the results (flux and sulphate rejection versus time) from a test over several hours with displacement washing at certain time intervals.

EXAMPLE 4

In addition to the laboratory experiments, tests have been performed in a membrane pilot plant unit using magnesium chloride brine.

Membrane type: B006, two 2.5 inch spiral wound modules in one pressure vessel.

MgCl$_2$ concentration: 314±13 g/kg

Sulphate concentration: 16±1 mg S/kg (measured as S)

Temperature: 70° C.

Flow: 850 kg/h

Pressure: 50 bar

Figure 5:
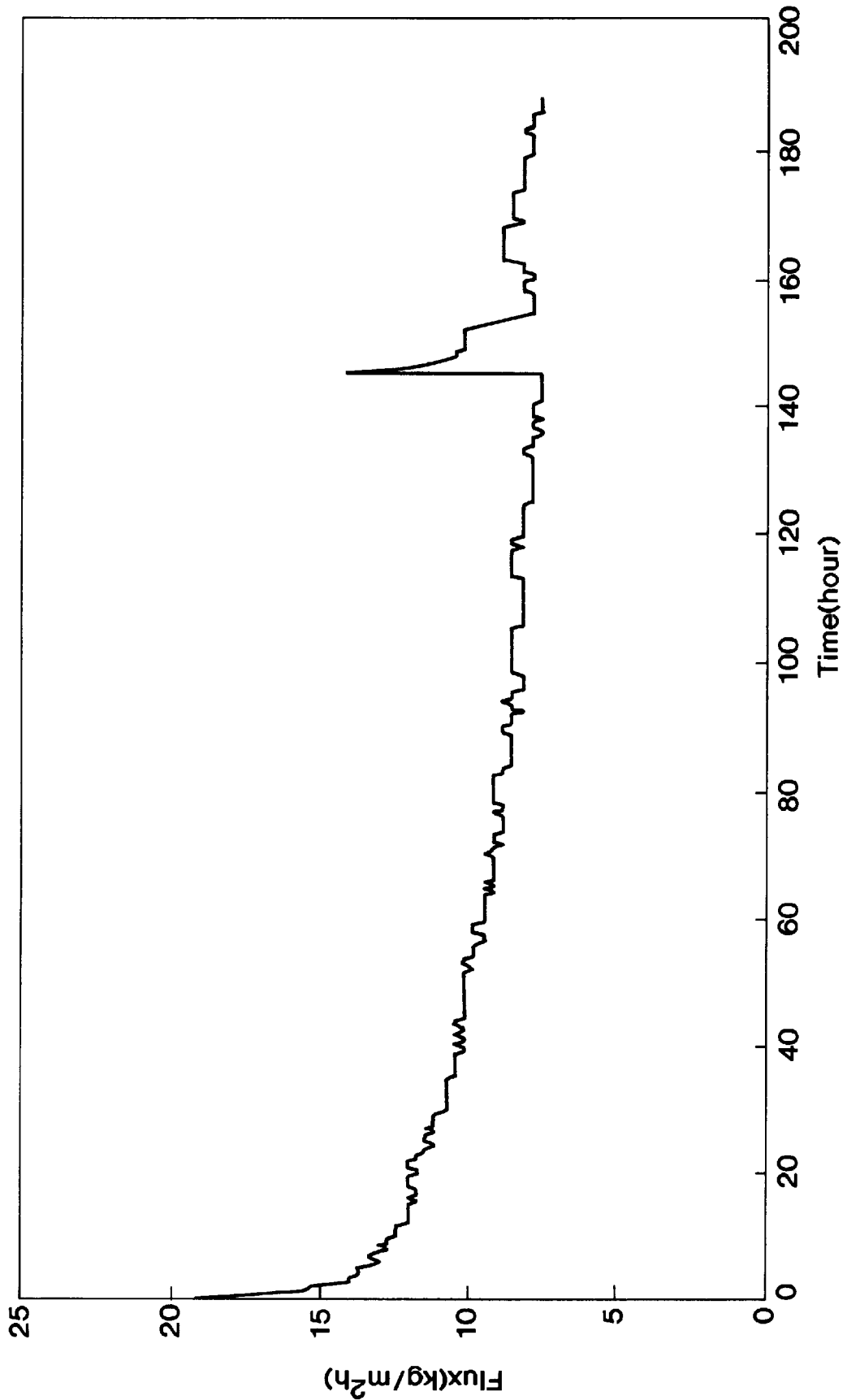
FIG. 5 shows flux versus time for a test run in a membrane pilot plant unit (B006 spiral wound membranes).

FIG. 5 shows the flux versus time for one of the test runs. As found in the laboratory experiments the flux decreases over time, but as indicated in FIG. 5 it may also be possible to run the membrane process in such a way (selection of membrane type, operating conditions) that the flux will be at a fairly constant value (9±1 kg/m$^2$h) for at least several days. After about 140 hours the brine flow was stopped and the membranes were washed with water for 20 minutes. This immediately gave a higher flux value, but after about 10 hours the flux had decreased to the same value as before the washing. Since the sulphate rejection seems to increase when the flux decreases (constant pressure), process simulations will be used to find the optimal operating conditions for a given membrane type.

EXAMPLE 5

Figure 6:
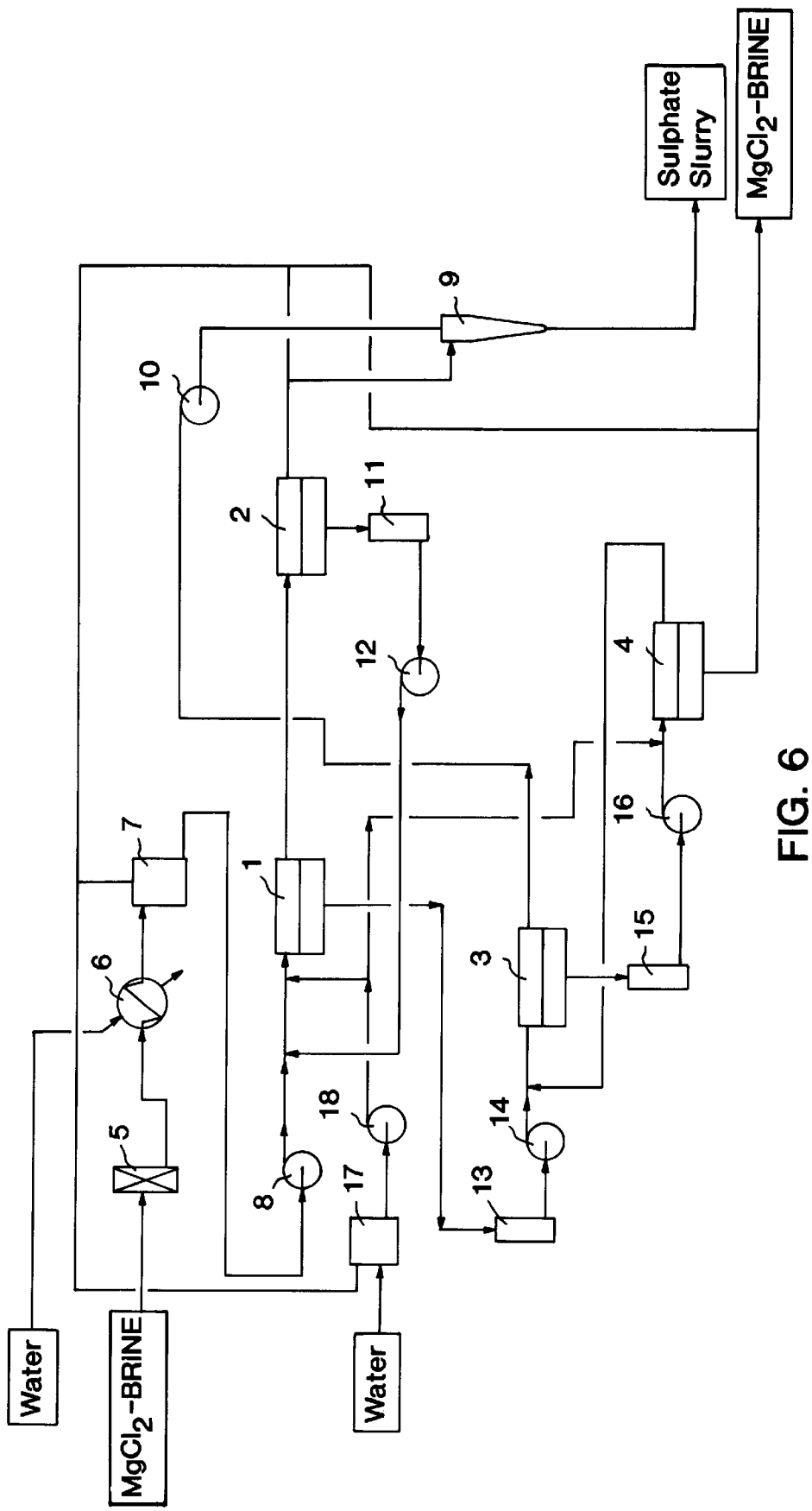
FIG. 6 shows a viable process layout for a full-scale membrane plant arrangement.

Simulations have been performed for a full-scale membrane process where the sulphate content is reduced from 60 to 20 ppm S. One possible process layout is shown schematically in FIG. 6, where 1, 2, 3 and 4 represent blocks of membrane modules connected in series with different total membrane area. The feed is entering a prefiltration unit 5, for solid removal before being adjusted to the specific temperature in a heat exchanger 6. From the buffer tank 7 the brine is pumped up to operating pressure 8 and is mixed with a recycle stream from 2 before entering the first membrane module 1. The concentrate from 1 is mixed with two recycle streams before entering 2. The concentrate from 2 has so high sulphate concentration that precipitation will occur. The solid free stream from the hydrocyclone 9 is pumped up to operating pressure 10 and recycled to 2. The permeate from 2 goes through a small buffer tank 11, and is pumped up to operating pressure 12 and returned to 1. From the small buffer tank 13 the permeate from 1 is pumped up to operating pressure 4 and mixed with recycled brine before entering 3. The concentrate from 3 is recycled to 2. The permeate from 3 enters a small buffer tank 15, and is then pumped up to operating pressure 16 and passed to the last membrane module 4. The concentrate from 4 is recycled to 3, while the permeate stream constitutes the primary product stream from the sulphate removal plant.

As shown in FIG. 4 the membrane efficiency might decrease over time. In order to prevent this, the membranes have to be rinsed with water at regular intervals, for example 10 minutes rinsing every 3 hours. When the plant is in a washing modus the feed stream will be stored in a buffer tank 1, and the product stream will be zero. The rinse water is stored in a storage tank 17 and enters the membrane plant through pump 18.

Feed stream: 30500 kg/h (7800 h per year)

MgCl$_2$ concentration: 450 g/kg

Sulphate concentration (feed): 60 mg S/kg (measured as S)

Temperature: 70° C.

Pressure: 55–60 bar

Product stream: 35200 kg/h (6700 h per year)

MgCl$_2$ concentration: 450 g/kg

Sulphate concentration: 20 mg S/kg (measured as S)

Concentrate stream: 300 kg/h (6700 h per year)

MgCl$_2$ concentration: 450 g/kg

Sulphate concentration: 4.75 mg S/kg (slurry) (measured as S)

As have been demonstrated by the examples it is possible to apply specially made or treated membranes that have the possibility to separate sulphate component(s) from a concentrated magnesium chloride brine at relatively high temperatures. Depending on the sulphate concentration and the degree of removal it is possible to combine several sets of membrane modules to achieve a specific sulphate level in the product with a relatively small loss of magnesium chloride.

The results also indicate that other anions, for example phosphates, will be removed in the same way as the sulphates, which will be a great advantage for the downstream process, i.e. the electrolytic production of magnesium metal.

We claim:

1. Method for sulphate removal from concentrated MgCl$_2$ solutions, characterized in that the solution is subjected to a high pressure nanofiltration process applying membranes having a dominantly negative surface charge, whereby the magnesium chloride and other metal chlorides are permeated through the membrane while the sulphate is withheld.

2. Method according to claim 1, characterized in that the applied membranes are porous polymeric nanofilter membranes.

3. Method according to claim 2, characterized in that the pore size is in the range of 0.5–2 nm.

4. Method according to claim 1 or 2, characterized in that the high pressure side on the membranes is operating in a range from 30 to 60 bar and the low pressure side is kept at atmospheric pressure.

5. Method according to claim 4, characterized in that a set of in series connected membrane modules is applied for a gradual removal of sulphate and other contaminants.

6. Method according to claim 4, characterized in that the membranes are rinsed with water at regular time intervals.

7. Method according to claim 1, characterized in that the concentration of magnesium chloride is 250–550 g/l.

8. Method according to claim 1, characterized in that the temperature is kept between 20 and 90° C.

9. Method according to one of claims 1–3, 7 or 8, characterized in that a set of in series connected membrane modules is applied for a gradual removal of sulphate and other contaminants.

10. Method according to claim 9, characterized in that the membranes are rinsed with water at regular time intervals.

11. Method according to one of claims 1–3, 7 or 8, characterized in that the membranes are rinsed with water at regular time intervals.

* * * * *